(12) United States Patent
Sheu et al.

(10) Patent No.: US 8,534,929 B2
(45) Date of Patent: Sep. 17, 2013

(54) OPTICAL FIBER CONNECTOR

(75) Inventors: Yi-Zhong Sheu, New Taipei (TW);
Tai-Cherng Yu, New Taipei (TW);
I-Thun Lin, New Taipei (TW);
Shih-Min Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 209 days.

(21) Appl. No.: 13/071,427

(22) Filed: Mar. 24, 2011

(65) Prior Publication Data
US 2012/0128306 A1    May 24, 2012

(30) Foreign Application Priority Data
Nov. 24, 2010 (TW) ................................ 99140493

(51) Int. Cl.
*G02B 6/36* (2006.01)

(52) U.S. Cl.
USPC ................................ 385/88; 385/89; 385/93

(58) Field of Classification Search
USPC ............. 385/53, 76, 88, 89, 92, 93, 94, 139; 398/135, 136, 137, 138, 139; 439/577
See application file for complete search history.

(56) References Cited

U.S. PATENT DOCUMENTS

| | | | | |
|---|---|---|---|---|
| 5,125,054 | A * | 6/1992 | Ackley et al. | 385/49 |
| 5,168,537 | A * | 12/1992 | Rajasekharan et al. | 385/89 |
| 6,164,838 | A * | 12/2000 | Maehara et al. | 385/92 |
| 6,754,406 | B2 * | 6/2004 | Kaneshiro et al. | 385/14 |
| 6,821,027 | B2 * | 11/2004 | Lee et al. | 385/89 |
| 7,255,489 | B2 * | 8/2007 | Krahenbuhl et al. | 385/88 |
| 7,502,566 | B2 * | 3/2009 | Kuwata et al. | 398/182 |
| 2003/0068141 | A1 * | 4/2003 | Velsher et al. | 385/92 |
| 2003/0091301 | A1 * | 5/2003 | Lee et al. | 385/89 |
| 2011/0085767 | A1 * | 4/2011 | Miao | 385/93 |
| 2012/0128306 | A1 * | 5/2012 | Sheu et al. | 385/88 |

* cited by examiner

*Primary Examiner* — Ellen Kim
(74) *Attorney, Agent, or Firm* — Altis Law Group, Inc.

(57) ABSTRACT

An optical fiber connector includes an optical fiber cable including two optical fibers; and a connector plug connected to opposite ends of the optical fiber cable for electrical connection to an electronic device. The connector plug includes a shell, a photodiode, a laser diode; and an electrical connector for electrical connection to an electronic device. The photodiode, the laser diode and the electrical connector are housed in the metallic shell, the photodiode is optically coupled to a distal end of one corresponding optical fiber and electrically coupled to the electrical connector, the laser diode optically is coupled to a distal end of the other optical fiber and electrically coupled to the electrical connector.

1 Claim, 5 Drawing Sheets

OPTICAL FIBER CONNECTOR

BACKGROUND

1. Technical Field

The present disclosure relates to an optical fiber connector.

2. Description of Related Art

Optical fibers connectors are being used for higher bandwidth transmission, as they have less light loss and longer distance transmission than USB connectors.

A conventional optical fiber connector uses one or more lenses at the end thereof to optically couple to the other connector. However, as the lenses are made of plastic or glass, as such the lenses are easily damaged in the repeating plugging and unplugging of the optical fiber connector.

What is needed, therefore, is an optical fiber connector, which can overcome the above shortcomings.

BRIEF DESCRIPTION OF THE DRAWINGS

Many aspects of the present optical fiber connector can be better understood with reference to the following drawings. The components in the drawings are not necessarily drawn to scale, the emphasis instead being placed upon clearly illustrating the principles of the present optical fiber connector. Moreover, in the drawings, like reference numerals designate corresponding parts throughout the several views.

FIGS. 2 and 3 are schematic views of an optical fiber connector in accordance with a second embodiment, wherein FIG. 2 shows a photodiode and a corresponding first optical fiber, FIG. 3 shows a laser diode and a corresponding second optical fiber.

DETAILED DESCRIPTION

Embodiments of the present optical fiber connector will now be described in detail below and with reference to the drawings.

Figure 1:
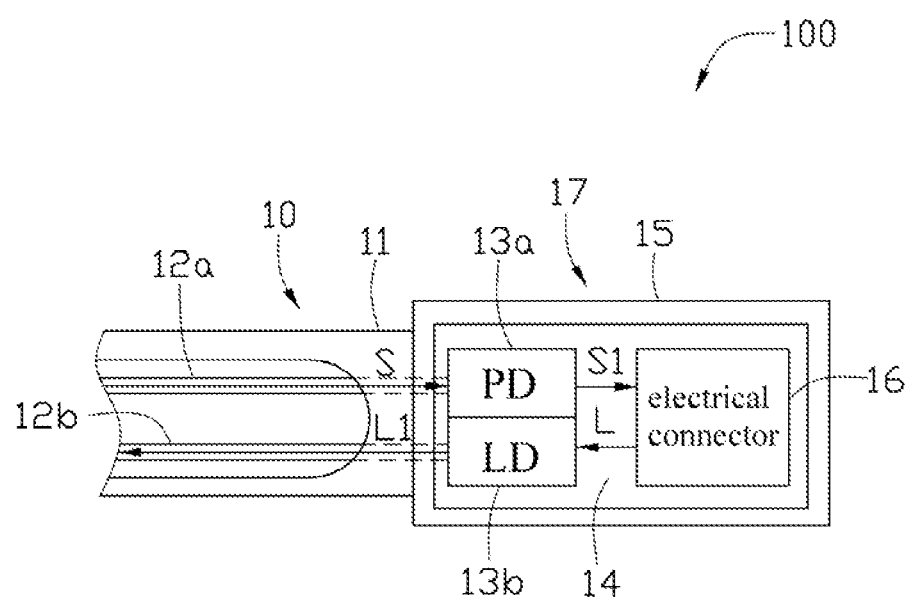
FIG. 1 is a schematic view of an optical fiber connector in accordance with a first embodiment.

Referring to FIG. 1, an optical fiber connector 100 in accordance with a first embodiment, is provided. The optical fiber connector 100 includes an optical fiber cable 10, and a connector plug 17 connected to an end of the optical fiber cable 10. The other end of the optical fiber cable 10 can have another connector plug according to need.

The optical fiber cable 10 includes a plastic jacket 11, and a first optical fiber 12a and a second optical fiber 12b accommodated in the plastic jacket 11. The plastic jacket 11 can be made of polyethylene (PE), polypropylene (PP), polystyrene (PS), polyvinyl chloride (PVC), polyethylene terephthalate (PET).

The connector plug 17 includes a metallic shell 15, with a circuit board 14, a photodiode (PD) 13a, a laser diode (LD) 13b and an electrical connector 16 located in the metallic shell 15. The circuit board 14 can be made of ceramics such as $Al_2O_3$-circuit board sapphire, or semiconductors such as silicon or silicon-circuit board materials. The photodiode 13a and the laser diode 13b both are mounted or directly formed or grown on the circuit board 14. The electrical connector 16 is mounted on the circuit board 14. The circuit board 14 can power the photodiode 13a, laser diode 13b, and the electrical connector 16. The electrical connector 16 can be application specific integrated circuit (ASIC), and configured for electrical connection to an electronic device.

The photodiode 13a can convert light signal into electrical signal, and the laser diode 13b can convert electrical signal into light signal. The photodiode 13a has a light sensing surface directly opposing the first optical fiber 12a, and the laser diode 13a has a light emitting surface directly opposing the second optical fiber 12b. In detail, referring again to FIG. 1, the photodiode 13a can directly receive the light signal S from the first optical fiber 12a and convert the light signal S into the electrical signal 51. The electrical connector 16 receives the electrical signal S1 from the photodiode 13a, and converts the electrical signal S1 into a receivable output signal such as a digital signal for an electronic device. In return, the electrical connector 16 converts an input signal from the electronic device into an electrical signal L, and the laser diode 13b receives the electrical signal L, and converts the electrical signal L into the light signal L1. The light signal L1 directly goes into the second optical fiber 12b.

Figure 2:
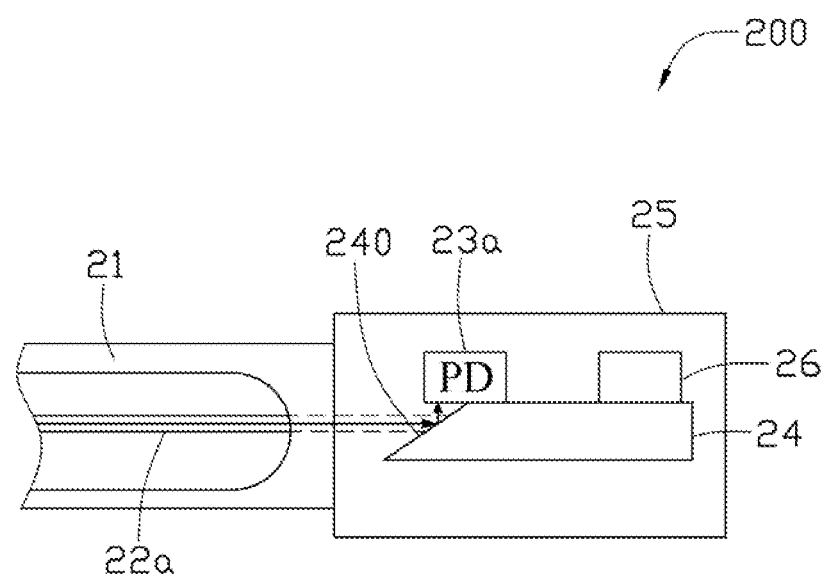
Figure 3:
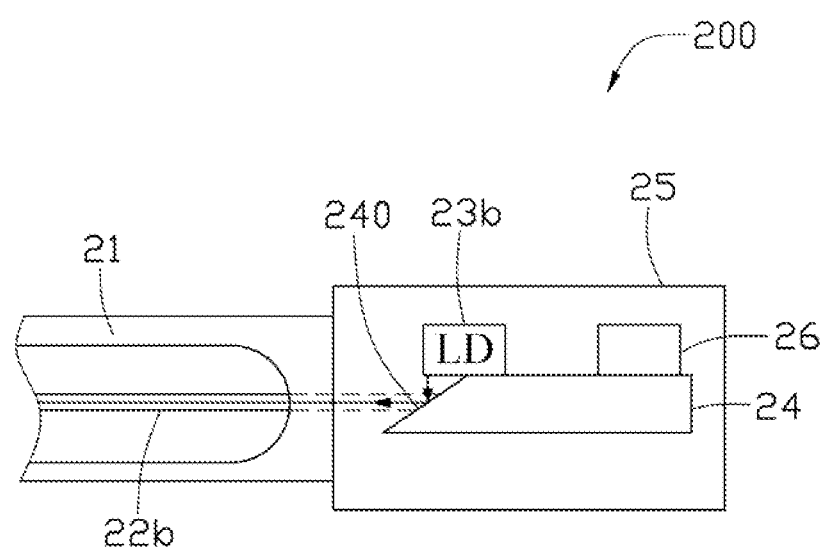

Referring to FIGS. 2 and 3, an optical fiber connector 200 in accordance with a second embodiment, is provided. In the optical fiber connector 200, each of the photodiode 23a and laser diode 23b opposes a reflecting surface 240 and as well as the electrical connector 26. In the illustrated embodiment, the reflecting surface 240 is a 45 degrees slanted surface formed on the circuit board 24, and the photodiode 23a and laser diode 23b are arranged above the reflecting surface 240. The reflecting surface 240 opposes a first optical fiber 22a and a second optical fiber 22b. The reflecting surface 240 can have a high reflecting index material layer coated thereon, such as a silver layer.

Light signal from the first optical fiber 22a is first reflected by the reflecting surface 240, and the reflected light signal goes to the photodiode 23a. Then the photodiode 23a converts the reflected light signal into electrical signal that is receivable by the electrical connector 26.

Electrical signal from the electrical connector 26 goes to the laser diode 23b, and the laser diode 23b converts the electrical signal into a light signal. The light signal is first reflected by the reflecting surface 240, and then the reflected light signal goes to the second optical fiber 22b.

The first optical fiber 22a and the second optical fiber 22b can be received in a same plastic jacket 21. In other embodiments, each of the first optical fiber 22a and the second optical fiber 22b can be located its own jacket 21 and thus they are separated from each other. In either one of the above embodiments, the photodiode 23a and the laser diode 23b can share a same circuit board 24 with one reflecting surface 240, and a same electrical connector 26, and each of the circuit board 24, electrical connector 26, the photodiode 23a and the laser diode 23b can be located in a same metallic shell 25.

Figure 4:
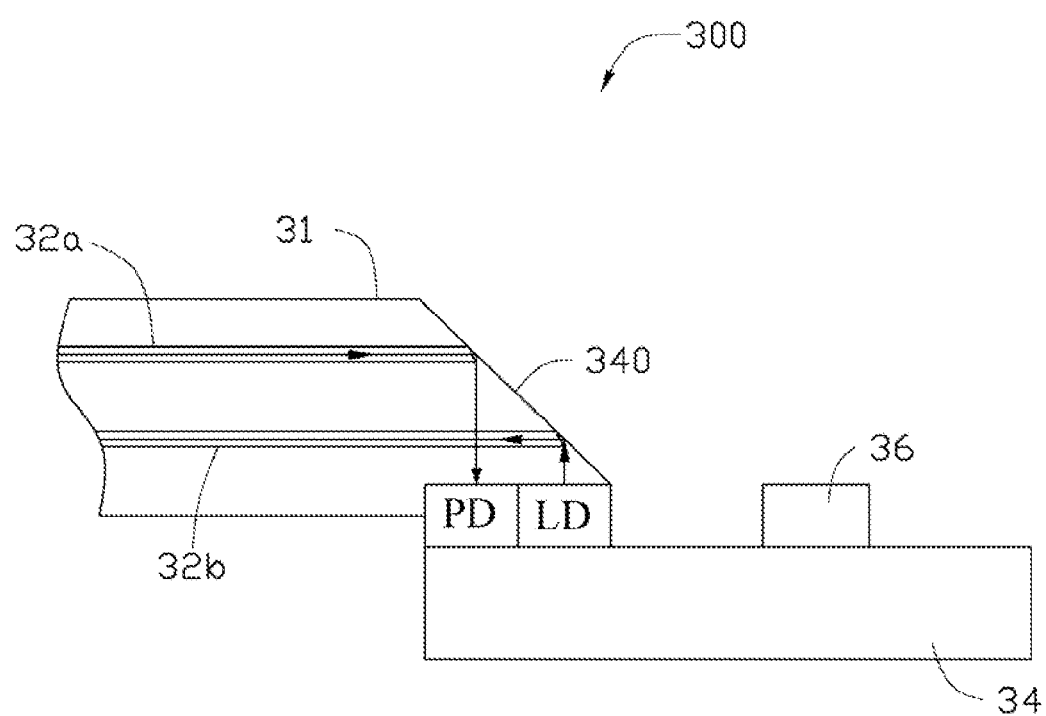
FIG. 4 is a schematic view of an optical fiber connector in accordance with a third embodiment.

Referring to FIG. 4, an optical fiber connector 300 in accordance with a third embodiment, is provided. The optical fiber connector 300 is similar to the optical fiber connector 200 illustrated above, however, the reflecting surface 340 is arranged higher than the photodiode and the laser diode which are arranged on the circuit board 34 and oppose the electrical connector 36, and the reflecting surface 340 is formed integrally with the plastic jacket 31 where the first and second optical fibers 32a, 32b are received.

Figure 5:
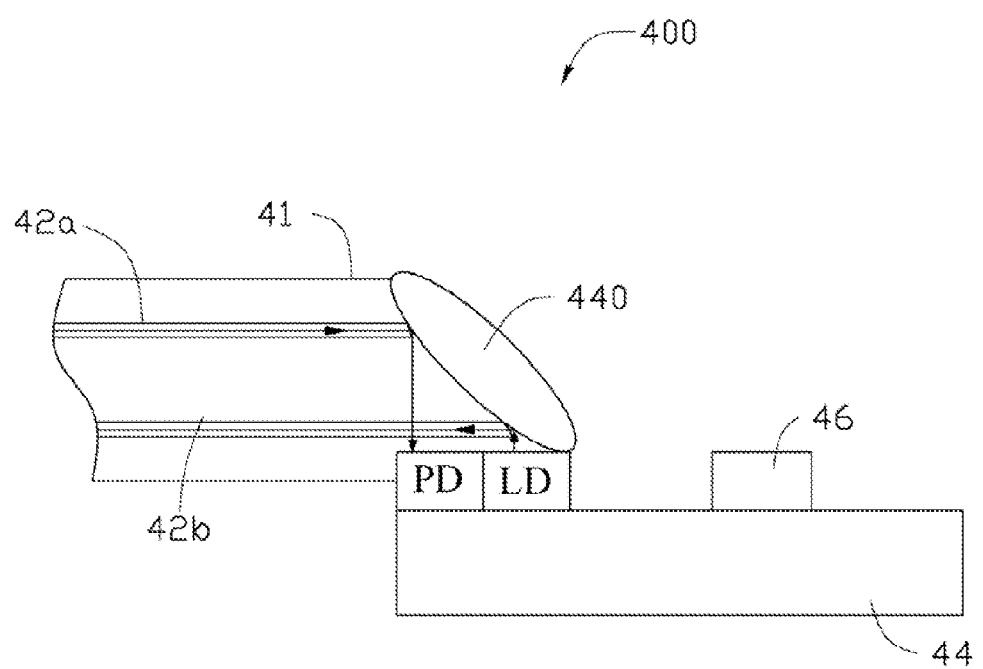
FIG. 5 is a schematic view of an optical fiber connector in accordance with a fourth embodiment.

Referring to FIG. 5, an optical fiber connector 400 in accordance with a fourth embodiment, is provided. The optical fiber connector 400 is similar to the optical fiber connector 300 illustrated above, however, the light reflecting is performed by a reflection lens 440 located separately above the circuit board 44 and higher than the photodiode and the laser diode. The photodiode, the laser diode and the electrical connector 46 are formed on the circuit board 44. The reflection lens 440 has a reflecting layer coated on an outer surface thereof, and the reflecting layer opposes the first and second optical fibers 42a, 42b which are received in the plastic jacket 41.

Concluded from the above, no lenses are used in the optical fiber connector, and the optical fiber connector can be repeatedly plugged in and unplugged.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical fiber connector, comprising:
   an optical fiber cable including a first optical fiber and a second optical fiber; and
   a connector plug fixedly connected to a distal end of the optical fiber cable, the connector plug comprising:
   a metallic shell;
   a circuit board fully housed in the metallic shell;
   a photodiode, a laser diode and an electrical connector all directly mounted on the circuit board in the metallic shell, the photodiode optically coupled to the first optical fiber and configured for receiving and converting a first light signal from the first optical fiber into a first electrical signal, the laser diode optically coupled to the second optical fiber and configured for converting a second electrical signal to a second light signal and sending the second light signal to the second optical fiber, the electrical connector for electrical connection to an electronic device and configured for generating the second electrical signal and receiving the first electrical signal; and
   a light reflecting surface defined on an outer surface of a reflection lens, each of the photodiode and the laser diode being optically coupled to the corresponding optical fiber by means of the light reflecting surface.

* * * * *